United States Patent [19]

Noda

[11] 4,415,923
[45] Nov. 15, 1983

[54] SIGNAL PROCESSING CIRCUIT
[75] Inventor: Masaru Noda, Fujisawa, Japan
[73] Assignee: Hitachi, Ltd., Tokyo, Japan
[21] Appl. No.: 294,058
[22] Filed: Aug. 18, 1981
[30] Foreign Application Priority Data Aug. 25, 1980 [JP] Japan .................................. 55-115957

[51] Int. Cl.³ .......................... H04N 9/04; H04N 9/07
[52] U.S. Cl. ........................................ 358/41; 358/32; 358/39; 358/51
[58] Field of Search .................. 358/21 R, 32, 39, 41, 358/43, 51

[56] References Cited

U.S. PATENT DOCUMENTS 2,858,362 10/1958 Bedford ................................ 358/32
3,934,265 1/1976 Tanaka .................................. 358/43
4,166,280 8/1979 Poole ..................................... 358/41

OTHER PUBLICATIONS

All Solid State Color Camera With Single-Chip MOS Imager, by Nabeyama, IEEE Transactions on Comsumers Electronis, vol. CE-27, Feb. 1981.

Primary Examiner—Tommy P. Chin
Attorney, Agent, or Firm—Antonelli, Terry & Wands

[57] ABSTRACT

A signal processing circuit for a color video camera. Image of an object is focused onto a plurality of light-sensitive elements (W, Ye, G, Cy) through a plurality of optical color filters which are in color complementating relationship and is taken out in terms of a luminance signal (Y), a red color signal (R) and a blue color signal (B) through photo-electric conversion. A green color signal is prepared on the basis of the red color signal, the blue color signal and the luminance signal. Gamma correction is made on the green color signal, the red color signal and the blue color signal. A luminance signal is reconstructed on the basis of the green color signal which has undergone the gamma-correction, and the gamma-corrected red and blue color signals. A color video signal which has undergone correct gamma-correction is thus obtained.

10 Claims, 5 Drawing Figures

SIGNAL PROCESSING CIRCUIT

The present invention relates in general to a video camera apparatus for producing color television signals. In particular, the present invention concerns a signal processing circuit for a color video camera which is capable of reproducing an image of an object in correct colors with an improved fidelity.

A typical color video camera for converting the image of an object into color television signals comprises in general a first image tube which is sensitive to red color, a second image tube sensitive to green color and a third image tube which is sensitive to blue color. The object in concern is picked-up through the individual image tubes, whereby the red color signal is derived from the red-sensitive image tube, the green color signal is derived from the green-sensitive image tube and the blue color signal is derived from the image tube which is sensitive to the blue color. These three primary color signals are subsequently subjected to gamma-correction, and white-clipping, black-clipping, color encoding and the like processings, whereby the color television signal is obtained which conforms to the NTSC standards, for example.

Recently, as video tape recorders for home use become more popular, the use of the color video camera also designed for home use tends to spread increasingly and the constructions thereof become more simple. At present, the color video camera for home use is formed primarily of a single tube type which incorporates a single image tube. The color television signals produced by the single tube type color video camera are not the red color signal, the green color signal and the blue color signal, but rather a luminance signal of a basic band which corresponds to a mixture of the three primary color signals and a color-multiplexed signal obtained through modulation of a carrier with the red color signal and the blue color signal. The red color signal and the blue color signal carried by the carrier is demodulated to baseband through synchronous demodulation or the like means. Among the luminance and the color signals thus obtained, the luminance signal is satisfactory in respect of resolution and SN ratio, whereas both the red color signal and the blue color signal are usually of narrow bandwidths and have a poor SN ratio.

At present, the color video camera in which a semiconductor image pick-up device is used in place of the image tube is being developed. In conjunction with this type of the video camera, there has been proposed a complementary color system in which red and blue color filters having low transmissivities are replaced by filters of complementary colors, such as yellow and cyan exhibiting a high light transmissivity as the color decomposing optical filters, with a view to deriving with a satisfactory SN ratio a maximum number of the luminance signals from the image pick-up element having the smallest possible light sensitive area.

In the video camera of the complementary color type, colorless and transparent filters allowing all spectra of light to pass therethrough, yellow color filters adapted to pass yellow light, green color filters for passing green color light and cyan color filters for passing cyan color light are provided in great number in a stripe-like or mosaic-like array. This filter array is disposed in front of the image pick-up device composed of a corresponding number of light-sensitive elements such as photodiodes or the like provided on the surface of the image pick-up device located in opposition to the filter array. The image of an object is focused onto the image pick-up device through the color filter array. The output signals from the light-sensitive elements corresponding to the respective color filters are sequentially read out thereby to produce the color signals.

However, the color signal available from the video camera of the structure mentioned above is obviously different from the color signal available from the video camera used in the broadcasting station in that the former is constituted by a multiplex signal of the luminance signal, the red color signal and the blue color signal. As a consequence, the gamma-correction of such color signal can not involve the correct color reproduction. More particularly, the gamma-correction should inherently be made on the red color signal, the green color signal and the blue color signal. Accordingly, there arises a problem when the luminance signal, the red color signal and the blue color signal are to undergo the gamma correction. Thus, when an object in red and/or magenta colors having a high saturation is picked up by the color video camera of this type and reproduced by a television receiver, the reproduced image will appear as being covered or dulled by an orange color as a whole, with vividness in colors being lost in the reproduced image. Further, the faces of people and the like tend to be reproduced as a yellow-intensified image, involving degradation of the image quality.

An object of the present invention is to provide a signal processing circuit for a color video camera adapted to produce as outputs the luminance signal, red color signal and the blue color signal, which circuit allows the image of an object to be reproduced in correct colors (or hues and saturations) with high fidelity.

In view of the above object, it is taught according to an aspect of the invention that low frequency components are derived, respectively, from the red color signal and the blue color signal available from the image pick-up device. The low frequency components of the red color signal and the blue color signal are supplied to a first matrix circuit together with the luminance signal, to be processed through arithmetic operation for preparing a pseudo-green signal which corresponds to a low frequency component of the inherent green color signal. The pseudo-green signal as well as the low frequency components of the red color signal and the blue signal are subjected to the respective gamma-corrections. Subsequently, these three signals having undergone the respective gamma-corrections are supplied to a second matrix circuit to be arithmetically processed for deriving again the luminance signal, the red color signal and the blue color signal. In this way, the green color signal is also subjected to the gamma-correction, whereby the image of an object can be reproduced in correct colors with an improved fidelity.

Above and other objects, features and advantages of the present invention will become more apparent from the following description of preferred embodiments of the invention taken in conjunction with the accompanying drawings, in which.

In the following, a signal processing circuit for a color video camera according to the invention will be described in conjunction with an exemplary embodiment of the invention illustrated in the accompanying drawings. For a better understanding of the invention, a color video camera for obtaining color video signals with the aid of a single image pick-up element will first be reviewed briefly for making clear the problems which arise when the gamma-correction is conducted on the output signals from the video camera. Thereafter, the signal processing circuit according to the invention will be described in detail.

Figure 1:
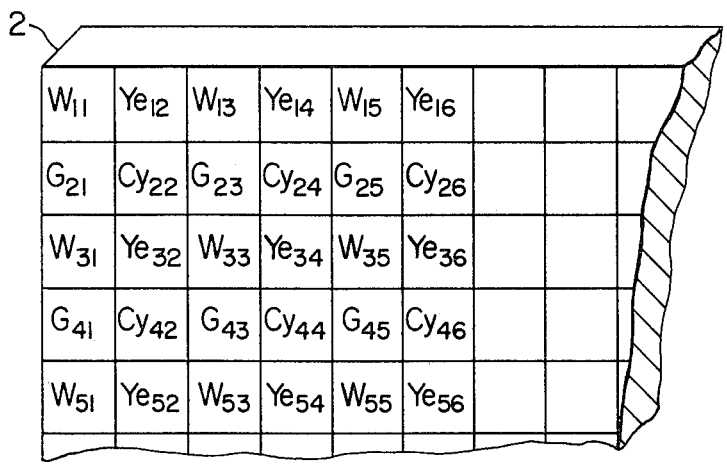
FIG. 1 is a front view showing an array of light-sensitive elements in a color video camera according to an embodiment of the invention.

FIG. 1 illustrates a typical example of an array of photosensitive or light-sensitive elements corresponding to an array of color filters in a color video camera to which the present invention may be applied. Reference numeral 2 generally denotes an image pick-up device element. At partitioned sections labelled W, there are disposed all color sensitive elements which can responsively sense light components of all colors having passed through associated colorless and transparent filters. At partitioned sections labelled Ye, there are disposed yellow sensitive elements which can respond to light components having passed through associated yellow filters. At partitioned sections labelled G, there are disposed green sensitive elements which can responsively sense light components having passed through associated green filters. Finally, at partitioned sections labelled Cy, there are disposed light-sensitive elements which can sense light components having been transmitted through associated cyan filters. Suffix numerals attached to the labelling letters identify positions of the individual light-sensitive elements in the array. The image pick-up element or device 2 may be constituted, for example, by a number of photodiodes and MOS FET's (metal-oxide-semiconductor field effect transistor) for extracting output signals from the associated photodiodes which may be implemented on a single semiconductor chip in a regular array.

In the case of the illustrated image pick-up element, four picture elements, W, Ye, G and Cy constitute a group or unit which is repeated through the whole array. The sequence for reading out the output signals from the individual light-sensitive elements is effected in such a manner that the output signals from two light-sensitive elements disposed in a same vertical column on two adjacent horizontal rows are simultaneously read out in pair in a sequential order. That is, the output signals from the light-sensitive elements $W_{11}$ and $G_{21}$ are first read out simultaneously, which are followed by the simultaneous reading-out of the output signals from the elements $Ye_{12}$ and $Cy_{22}$ in pair. Then, the output signals from the elements $W_{13}$ and $G_{23}$, and then the output signals from the elements $Ye_{14}$ and $Cy_{24}$ and so forth disposed in the first and the second rows of the image pick-up element 2 are read out. Next, the reading operation is effected by scanning the third and the fourth rows of the light-sensitive elements in the order of paired $W_{31}$ and $G_{41}$, $Ye_{32}$ and $Cy_{43}$, $W_{33}$ and $G_{43}$ and so forth. Such reading operation can be realized by using switch circuits each connected to the associated one of the light-sensitive elements and a vertical and horizontal scanning circuit for scanning successively these switch circuits in the sequence described above. The signals read out from the light-sensitive elements W are all collected by a signal line associated with these signals. In a similar manner, all the signals derived from the light-sensitive elements Ye are collected by an associated output signal line, while all the signals derived from the light-sensitive elements Cy are collected by an associated output line. Accordingly, four signal lines are provided in total in correspondence to the four colors. Preparation of a luminance signal, a red signal R and a blue signal B on the basis of the four signals derived through the output signal lines for the elements W, Ye, G and Cy is carried out in the following manner.

In view of the fact that the all-color-sensitive elements W sense responsively red, green and blue, the yellow-sensitive elements Ye sense responsively red and blue, the green-sensitive elements sense responsively green and that the cyan-sensitive elements can sense responsively green and blue, the output signals from the various light-sensitive elements can be resolved into the primary color signals, i.e. red component signal r, green component signal g and blue component signal b in accordance with the following expressions:

$$W = r + g + b \qquad (1)$$

$$Ye = r + g \qquad (2)$$

$$Cy = g + b \qquad (3)$$

$$G = g \qquad (4)$$

Through addition or subtraction of the output signals from the individual light-sensitive elements W, Ye, Cy and G with the aid of adders, these signals can be transformed into the luminance signal Y, the red color signal R and the blue color signal B in accordance with following expressions:

$$Y = W + Ye + Cy + G = 2(r + 2g + b) \qquad (5)$$

$$R = W + Ye - G - Cy = 2r \qquad (6)$$

$$B = W - Ye - G + Cy = 2b \qquad (7)$$

As can be seen from the expressions (5) to (7), through arithmetic processing in accordance with the expression (5) (i.e. $W + Ye + G + Cy$), there are obtained the sensed signals in response to the color components r, g and b with sensitivities in the ratio of 2r:4g:2b. TaKing into consideration the fact that the sensitivity of the light sensitive element for the color component b is low, the ratio of sensitivity mentioned above approximates to the luminance signal synthesizing ratio which is given by $Y = 0.3r + 0.59g + 0.11b$ according to the NTSC standard. Accordingly, the luminance signal Y can be obtained to a satisfactory degree through the arithmetic processing in accordance with the expression (5).

It should be recalled that the reading of the output signals from the light sensitive elements is effected by simultaneously scanning the two elements located in the same vertical column for every pair of the two adjacent rows so that the sensed color component signals W and G on one hand and Ye and Cy on the other hand are simultaneously derived, respectively. In this connection, it will be seen that when the signals read out simultaneously from the vertically adjacent light sensitive elements are added together, then the sum signal corresponds to the one which is given by $\gamma+2g+b$ for any pair of the vertically adjacent light sensitive elements. Thus, this sum signal is nothing but the luminance (Y) signal mentioned above. In other words, the signal derived through the arithmetic processing in accordance with the expression $W+Ye+G+Cy$ is always the luminance (Y) signal throughout the scanning of all the paired light-sensitive elements. It is thus possible to obtain the signal Y with a high resolution. In this manner, a maximum number of the signals Y can be derived with an improved SN ratio while reducing the active or work area of the individual light-sensitive elements to a possible minimum.

Figure 2:
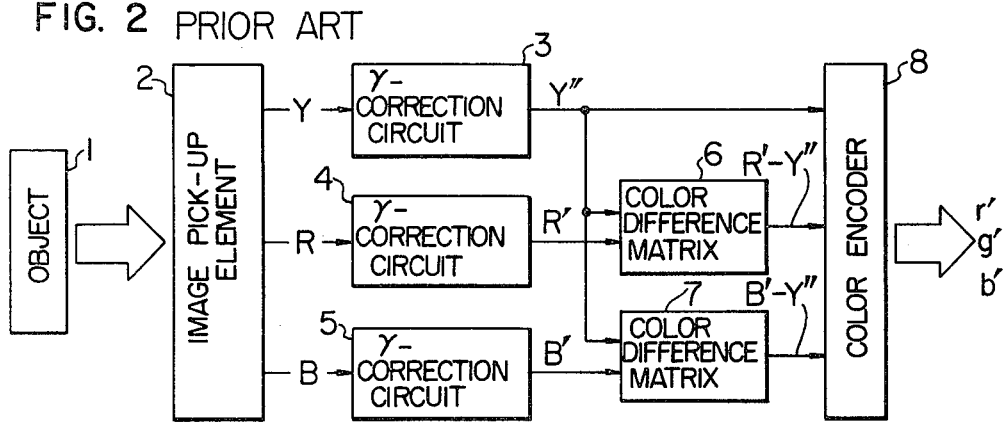
FIG. 2 shows in a block diagram an arrangement of a hitherto known gamma-correction circuit.

The luminance signal Y as well as the red color signal R and the blue color signal B thus derived are then subjected to the gamma correction. FIG. 2 shows in a block diagram a hitherto known gamma correction circuit. The image of an object 1 to be taken is picked up by the image pick-up element 2, whereby the brightness as well as hue and saturation of the object 1 are transformed into the luminance signal Y, and the red color signal R and the blue color signal B. The luminance signal Y is supplied to a first gamma correction circuit 3 having a $1/\gamma$-power characteristic to undergo the gamma correction. On the other hand, the red color signal R and the blue color signal B are supplied to second and third gamma correction circuits 4 and 5, respectively, to undergo the gamma correction in a similar manner as the luminance signal Y. When the luminance signal which has undergone the gamma correction by the first gamma correction circuit 3 is represented by $Y''$, the $\gamma$-corrected luminance signal $Y''$ is supplied to a color encoder 8 and supplied at the same time to a first color difference matrix circuit 6 and a second color difference matrix circuit 7. Now, let's represent by $R'$ the red color signal which has undergone the gamma correction through the second gamma correction circuit 4, while the blue color signal which has undergone the gamma correction in the third gamma correction circuit 5 is represented by $B'$. The $\gamma$-corrected red color signal $R'$ is supplied to the color difference matrix circuit 6 in which subtraction with the luminance signal $Y''$ is carried out. The difference signal output from the first color difference matrix circuit 6 is supplied to the color encoder 8. On the other hand, the $\gamma$-corrected blue color signal $B'$ is supplied to the second color difference matrix circuit 7 in which subtraction with the luminance signal $Y''$ is effected. The difference signal output from the matrix circuit 7 is supplied to the color encoder 8. When a red signal component, a green signal component and a blue signal component are represented by $r'$, $g'$ and $b'$, respectively, relations given by the following expressions validly apply among the signals processed in the circuit shown in FIG. 2. Namely, $$Y=0.30R+0.59G+0.11B \tag{8}$$

$$R'=R^{1/\gamma} \tag{9}$$

$$B'=B^{1/\gamma} \tag{10}$$

$$G'=G^{1/\gamma} \tag{11}$$

$$Y''=Y^{1/\gamma}=(0.30R+0.59G+0.11B)^{1/\gamma} \tag{12}$$

$$Y'=0.30R^{1/\gamma}+0.59G^{1/\gamma}+0.11B^{1/\gamma} \tag{13}$$

It is to be noted that the signal $Y'$ given by the expression (13) is the luminance signal obtained on the assumption that the original luminance signal Y has been derived through the pick-up operation and undergone the gamma correction in accordance with the NTSC standard with fidelity. On the basis of the above expressions, the primary component signals $r'$, $g'$ and $b'$ contained in the output signal from the color encoder are given as follows:

$$r'=(R'-Y'')+Y''=R'=R^{1/\gamma} \tag{14}$$

$$b'=(B'-Y'')+Y''=B'=B^{1/\gamma} \tag{15}$$

$$g'=\{-(0.30/0.59)\cdot(R'-Y'')-(0.11/0.59)\cdot(B'-Y'')\}- \\ +Y''=\{-(0.30/0.59)\cdot(R'-Y')-(0.11/0.59)\cdot(B'-Y')\}+Y'-(0.41/0.59)Y'+(0.41/0.59)Y''-Y'- \\ +Y''=G'+(1/0.59)\cdot(Y''-Y')\geqq G' \tag{16}$$

Figure 3:
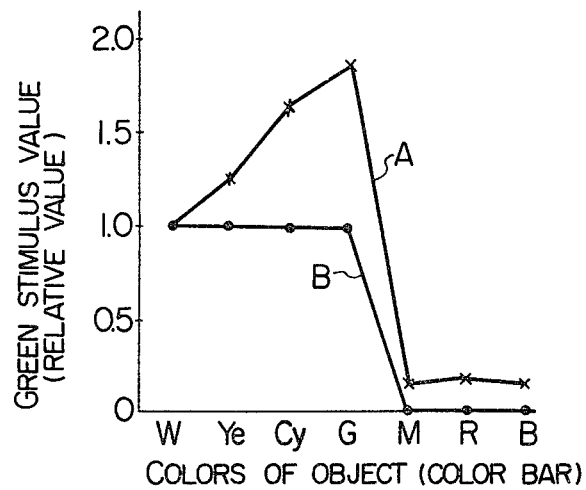
FIG. 3 illustrates characteristics of color signals obtained in the gamma-correction circuit shown in FIG. 2.

As can be seen from the expressions (14), (15) and (16), the red signal component $r'$ and the blue signal component $b'$ represent with fidelity to the principle the red color signal R and the blue color signal B, respectively, which have undergone the respective gamma corrections. On the other hand, it will be seen that the green signal component $g'$ contains a component given by the term $(1/0.59)\cdot(Y''-Y')$ in addition to the green color signal $G'$ which represents the green color signal G which has undergone the proper gamma correction and thus includes an error corresponding to this component. FIG. 3 graphically illustrates how the error component contained in the green component signal $g'$ gives rise to distortion in the reproduced image. The graph shown in FIG. 3 is depicted on the assumption that the object to be picked up is a color bar pattern, wherein the green error component is given for a reproduced image in terms of error in green stimulus. In this figure, a curve A corresponds to the reproduced image, while a curve B corresponds to the object or the color bar pattern. As will be noted from FIG. 3, the green component is admixed with magenta and red color components in the reproduced image, resulting in that those portions which should be inherently in magenta and red tend to be reproduced in orange-like color. Further, green is intensified over the whole reproduced image. As the consequence, important portions of the reproduced image such as features of men and the like tend to appear with a yellow color being intensified as a whole.

Figure 4:
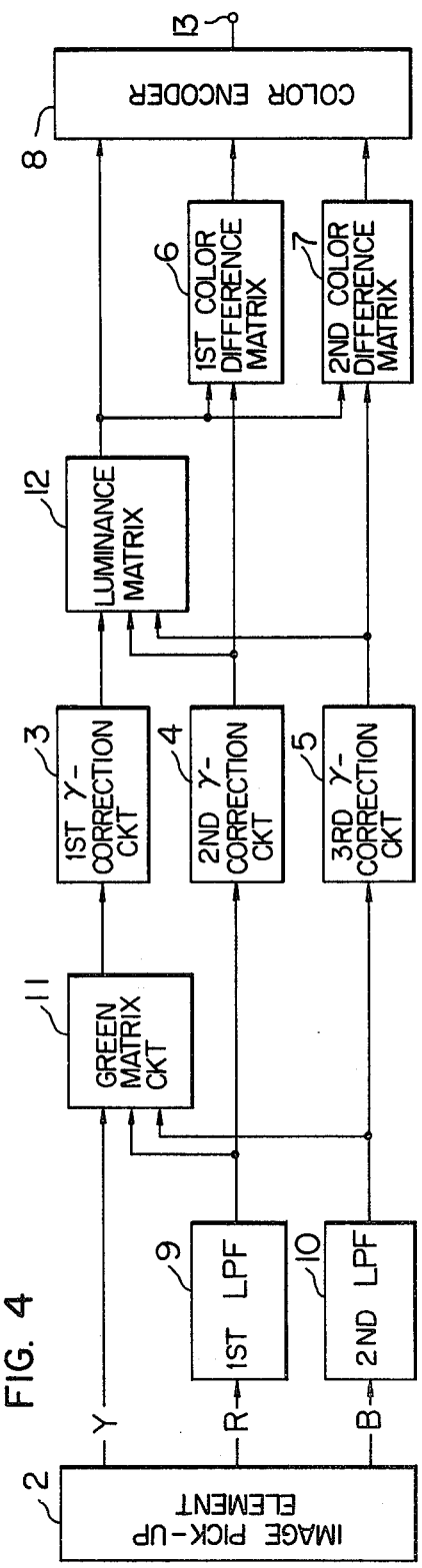
FIG. 4 shows in a block diagram an exemplary embodiment of a signal processing circuit for a color video camera according to the invention.

FIG. 4 is a block diagram of an exemplary embodiment of the signal processing circuit for a color video camera according to the invention. Referring to FIG. 4, the red color signal R outputted from the image pick-up element 2 is supplied to a first low-pass filter 9, while the blue color output signal B is supplied to a second low-pass filter 10. The low-pass filters 9 and 10 serve to extract low frequency components from the red and blue color signals. The output signals from these filters 9 and 10 are supplied to a green color matrix circuit 11 and at the same time to second and third gamma correction circuits 4 and 5, respectively. The green color matrix circuit 11 is also supplied with the luminance signal Y derived from the image pick-up element 2, wherein a pseudo-green color signal [G] is prepared on the basis of the luminance signal Y, the red color low frequency component signal $R_L$ and the blue color low frequency component signal $B_L$ through matrix operation. The pseudo-green color signal [G] thus preprepared is supplied to a first gamma correction circuit 3. The output signal from the first gamma correction circuit 3 is supplied to a luminance matrix circuit 12, while the output signal from the second gamma correction circuit 4 is supplied to the luminance matrix circuit 12 and a first color difference matrix circuit 6. Further, the output signal from the third gamma correction circuit 5 is supplied to the luminance matrix circuit 12 and a second color difference matrix circuit 7. The luminance matrix circuit 12 serves to produce the luminance signal Y through matrix operation on the basis of the pseudo-green signal [G], the red color signal and the blue color signal which have undergone the respective gamma corrections. The output signal from the luminance matrix circuit 12 is supplied to the color encoder 8 and at the same time to the first and the second color difference matrix circuits 6 and 7. Thus, the color signal which has been gamma-corrected in precision is obtained from the output terminal 13 of the color encoder 8.

In the circuit arrangement described above, the first and the second low-pass filters 9 and 10 extract the low frequency red color signal component $R_L$ and the low frequency blue color signal component $B_L$ of frequencies lower than 500 KHz, inclusive, which are required for reproducing hue and saturation. The extracted low frequency component signals $R_L$ and $B_L$ are supplied to the succeeding gamma correction circuits 4 and 5 and the green color matrix circuit 11. In the green color matrix circuit 11, matrix operation is executed on the three input signals Y, $R_L$ and $B_L$ in accordance with the following expression (17) to thereby derive the pseudo-green signal [G].

$$[G] = (Y - 0.30R_L - 0.11B_L)/0.59 \qquad (17)$$

For convenience of explanation the luminance signal Y supplied to the input of the green color matrix circuit 11 is divided into a low frequency luminance signal component $Y_L$ of a frequency band equivalent to those of the signals $R_L$ and $B_L$ and a high frequency luminance signal component $Y_H$ of a frequency band higher than those of the signals $R_L$ and $B_L$. Then, the above expression (17) may be rewritten as follows:

$$\begin{aligned} G &= (Y - 0.30R_L - 0.11B_L)/0.59 \\ &= (Y_L - 0.30R_L - 0.11B_L)/0.59 + Y_H/0.59 \\ &= [G_L] + Y_H/0.59 \end{aligned} \qquad (18)$$

where $[G_L]$ represents a pseudo-low-frequency-green color signal component. It is thus apparent that only the low-band frequency component of the output signal from the green color matrix circuit 11 has been converted into the pseudo-green color signal, while the high-band frequency component is outputted as the luminance signal. The pseudo-green output signal from the green color matrix circuit 11 is supplied to the gamma correction circuit 3 and arithmetically processed to be transformed into a $\gamma$-corrected signal [G]' in accordance with the following expression (19):

$$[G]' = \{[G_L] + Y_H/0.59\}^{1/\gamma} \qquad (19)$$

Since the term $Y_H/0.59$ may be considered a minute A.C. component superposed on the low frequency component $[G_L]$, the equation (19) may be approximated by the following equation (20).

$$[G]' = [G_L]^{1/\gamma} + 1/\gamma \cdot [G_L]^{(1/\gamma)-1} \cdot Y_H/0.59 \qquad (20)$$

The first term of the right-hand member of the equation (20) corresponds to the low frequency component and is equal to the gamma-corrected pseudo-green color signal, while the second term corresponds to the high frequency luminance component modulated in accordance with the magnitude of the low frequency luminance component.

The meaning of the expression (20) resides in that at least the low frequency component signal determinant for the color reproduction can be obtained which is equivalent to the gamma-corrected green signal, not to speak of the high frequency component signal. Accordingly, there will no more arise such error in color reproduction which is produced in the gamma-correction of the signals Y, R and B, as described hereinbefore. In the luminance matrix circuit 12, three inputs, that is the signal [G]' given by the expression (20), and the signals $R_L'$ and $B_L'$ which have undergone gamma corrections in the circuits 4 and 5 of the R- and B-channels, respectively, are arithmetically processed in accordance with the following expression (21) to produce the signal Y'. Namely, $$Y' = 0.30R_L' + 0.59[G_L]^{1/\gamma} + 0.11B_L' + 0.59 \cdot 1/\gamma \cdot [G_L]^{(1/\gamma)-1} \cdot Y_H/0.59 = Y_L' + 1/\gamma \cdot [G_L]^{(1/\gamma)-1} \cdot Y_H \qquad (21)$$

Since the low frequency component signal $Y_L'$ conforms in substance to the NTSC standard, correct color signals containing no error can be obtained by deriving the color difference signals $(R_L' - Y_L')$ and $(B_L' - Y_L')$ from the low frequency luminance component signal $Y_L'$ and the low frequency red and blue color component signals $R_L'$ and $B_L'$ in the color difference matrix circuits 6 and 7, respectively. On the other hand, the high frequency component of the signal Y' is expressed by $1/\gamma \cdot [G_L]^{(1/\gamma)-1} \cdot Y_H$, and differs from an ideal high frequency luminance signal component which conforms correctly to the NTSC standard. Further, this high frequency component of the signal Y' differs from the high frequency luminance component obtained through the gamma correction of the luminance signal Y itself. However, distortions brought about in the reproduced color picture by errors contained in such high frequency luminance component are of such degree that people can recognize only slight difference in details and contours of the reproduced image. In other words, degradation in quality of the reproduced image due to the errors in the high frequency luminance signal component can be neglected, when compared with distortions in the color reproduction brought about through the straightforward gamma corrections of the signals Y, R and B.

Figure 5:
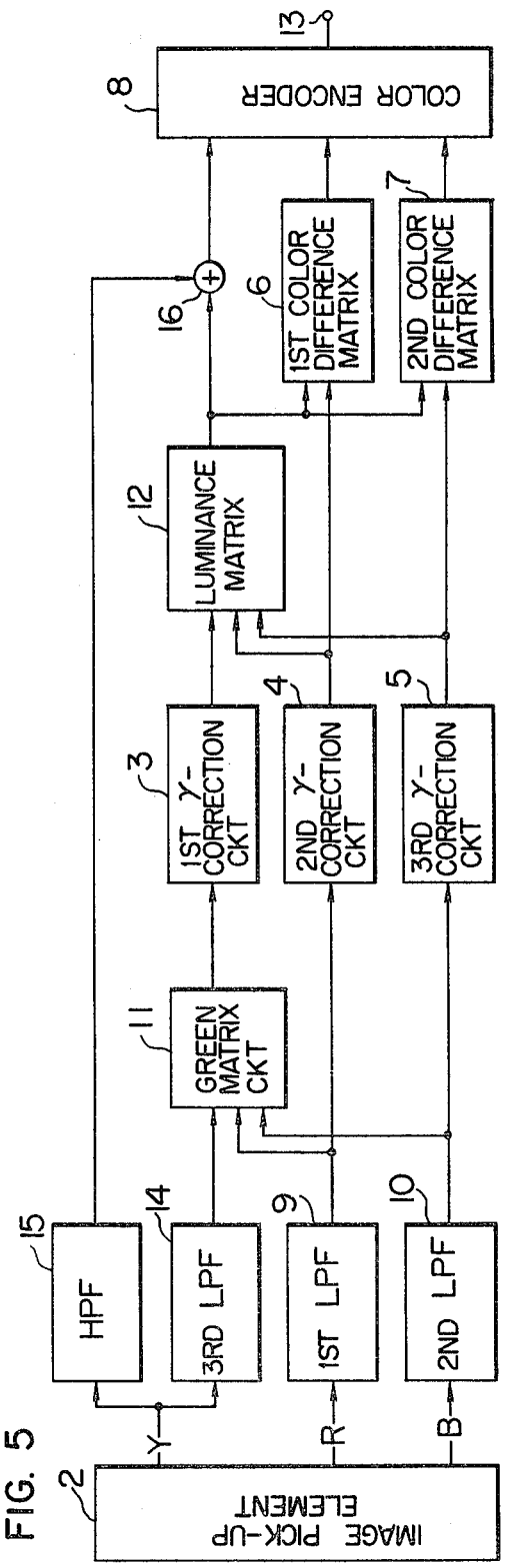
FIG. 5 shows in a block diagram another exemplary embodiment of the signal processing circuit for the color video camera according to the present invention.

Next, a second exemplary embodiment of the present invention will be described by referring to FIG. 5. In this figure, a reference numeral 14 denotes a third low-pass filter in the luminance signal channel.

The pass bandwidth of the filter 14 is substantially equal to those of the low-pass filters 9 and 10 disposed in the red color signal channel and the blue color signal channel, respectively. A numeral 15 denotes a high-pass filter which is inserted in the luminance signal channel and which has a pass bandwidth lying higher than the cut-off frequency of the low-pass filter 14. A reference numeral 16 denotes an adder circuit. The other circuit components shown in FIG. 5 serve for the functions same as or equivalent to those shown in FIG. 4. Accordingly, further description of them will be unnecessary. The luminance signal Y obtained from the image pick-up element 2 is divided into a low frequency luminance component signal $Y_L$ and high frequency luminance component signal $Y_H$ with reference to about 500 KHz by means of the low-pass filter 14 and the high-pass filter 15, wherein the low frequency luminance component $Y_L$ is applied to the input of the green color matrix circuit 11, while the high frequency luminance component $Y_H$ is applied to the adder circuit 16. Processing of the signals R and B is effected in the same manners as is in the case of the first exemplary embodiment described above in conjunction with FIG. 4. The green color matrix circuit 11 is adapted to perform arithmetic operation on the three input signals $Y_L$, $R_L$ and $B_L$ in accordance with the following expression (22) to thereby produce a pseudo-low frequency green signal $[G_L]$.

$$[G_L]=(Y_L-0.30R_L-0.11B_L)/0.59 \qquad (22)$$

Since the signal $[G_L]$ corresponds to the low frequency component of the green color signal, error in the color reproduction which is brought about through straight-forward gamma-correction of the signals Y, R and B as described hereinbefore can be effectively suppressed through gamma-correction of the signals $[G_L]$, $R_L$ and $B_L$. The gamma-corrected signals $[G_L]'$, $R_L'$ and $B_L'$ are applied to the luminance matrix circuit 12 and arithmetically processed in accordance with expression (23) mentioned below to thereby produce the signal $Y_L'$.

$$Y_L'=0.30R_L'+0.50[G_L]'+0.11B_L' \qquad (23)$$

On the other hand, the high frequency luminance signal component $Y_H$ is supplied, as it is, to the adder circuit 16 without being subjected to the processings by the green color matrix circuit 11 and the gamma-correction circuit 3 and combined with the signal $Y_L'$ mentioned above by the adder circuit 16. As the result, the output signal from the adder circuit 16 is a signal expressed as $Y_L'+Y_H$. In other words, the adder circuit 16 outputs the luminance signal of which low frequency component has been gamma-corrected, while the high frequency component thereof has not been subjected to the gamma-correction. The high frequency luminance signal component which undergoes no gamma-correction is effective to compress information of details in dark portion of the reproduced picture to make the dark portions to appear in a slightly blurred state. However, this high frequency luminance signal component is also effective to compress noises to make them inappreciable. Thus, there can be assured a highly improved quality of reproduced pictures, as compared with those obtained through the gamma-correction over the whole frequency band of the luminance signal Y.

As will be understood from the foregoing elucidations, the present invention has now proposed an improved signal processing circuit system for a color video camera which is capable of reproducing color image on the basis of the signals Y, R and B available from the image pick-up element of frequency separation type or color complementation type without involving turbidity or impurity in red and magenta and in colors of features of people and the like, while retaining advantages of the frequency separation system and the color complementation system such as good SN ratio, high resolution and others.

I claim:

1. A signal processing circuit for a color video camera, comprising:
   photoelectric conversion means for producing a luminance signal, a red color signal and a blue color signal from incoming light signal;
   first and second low-pass filters for allowing said red color signal and said blue color signal to pass therethrough, respectively;
   a first arithmetic operation circuit for combining the output signal from said first low-pass filter, the output signal from said second low-pass filter and said luminance signal to thereby produce a pseudo-green color signal having a low frequency component which corresponds to that of a green color signal;
   first, second and third gamma-correction circuits for processing said pseudo-green color signal, the output signal from said first low-pass filter and the output signal from said second low-pass filter, respectively; and
   a second arithmetic operation circuit for combining the output signals from said first, second and third gamma-correction circuits, respectively, thereby to produce a gamma-corrected luminance signal.

2. A signal processing circuit according to claim 1, further comprising first and second color difference circuits for subtracting the gamma-corrected luminance signal from said second arithmetic operation circuit from the output signals from said second and third gamma-correction circuits, respectively, to produce difference output signals.

3. A signal processing circuit according to claim 2, further comprising color encoder means for receiving the gamma-corrected luminance signal from said second arithmetic operation circuit and the difference output signals from said first and second color difference circuits for providing a gamma-corrected color output signal.

4. A signal processing circuit according to claim 3, wherein said first and second low-pass filters pass signals having frequencies lower than 500 KHz.

5. A signal processing circuit according to claim 1, wherein said first and second low-pass filters pass signals having frequencies lower than 500 KHz.

6. A signal processing circuit for a color video camera, comprising:
   photoelectric conversion means for producing a luminance signal, a red color signal and a blue signal from an incoming light signal;
   first, second and third low-pass filters for allowing said red color signal, said blue color signal and said luminance signal to pass therethrough, respectively;
   a high-pass filter for allowing said luminance signal to pass therethrough;
   a first arithmetic operation circuit for combining output signals from said first, second and third low-pass filters to thereby produce a low frequency green color signal of a low frequency band corresponding to that of a green color signal;
   first, second and third gamma correction circuits for processing said low frequency green color signal, the output signal from said first low-pass filter and the output signal from said second low-pass filter, respectively;
   a second arithmetic operation circuit for combining the output signals from said first, second and third gamma-correction circuits, respectively, to thereby produce a gamma-corrected low frequency luminance signal; and an adder circuit for adding the output signal from said second arithmetic operation circuit to the output signal from said high-pass filter to produce a gamma-corrected luminance signal.

7. A signal processing circuit according to claim 6, further comprising first and second color difference circuits for subtracting the gamma-corrected low frequency luninance signal from said second arithmetic operation circuit from the output signals from said second and third gamma-correction circuits, respectively, to produce difference output signals.

8. A signal processing circuit according to claim 7, further comprising color encoder means for receiving the gamma-corrected luminance signal from said adder circuit and the difference output signals from said first and second color difference circuits for producing a gamma-corrected color output signal.

9. A signal processing circuit according to claim 8, wherein said first, second and third low-pass filters pass signals having a frequency lower than 500 KHz and said high-pass filter passes signals having a frequency higher than 500 KHz.

10. A signal processing circuit according to claim 6, wherein said first, second and third low-pass filters pass signals having a frequency lower than 500 KHz and said high-pass filter passes signals having a frequency higher than 500 KHz.

* * * * *